March 10, 1942.  D. F. OTHMER  2,275,862
EXTRACTION OF LOWER ALIPHATIC ACIDS
Filed Sept. 14, 1938   2 Sheets-Sheet 1

DONALD F. OTHMER
INVENTOR
BY
ATTORNEYS

March 10, 1942.  D. F. OTHMER  2,275,862
EXTRACTION OF LOWER ALIPHATIC ACIDS
Filed Sept. 14, 1938  2 Sheets-Sheet 2

DONALD F. OTHMER
INVENTOR
BY
ATTORNEYS

Patented Mar. 10, 1942

2,275,862

UNITED STATES PATENT OFFICE 2,275,862

EXTRACTION OF LOWER ALIPHATIC ACIDS

Donald F. Othmer, Brooklyn, N. Y., assignor, by mesne assignments, to Tennessee Eastman Corporation, Kingsport, Tenn., a corporation of Virginia Application September 14, 1938, Serial No. 229,911

3 Claims. (Cl. 260—541)

This invention relates to extraction processes and apparatus, and more particularly to the use of di-isobutyl ketone for extracting aqueous acetic acid solutions and apparatus particularly adapted for carrying out such treatment. This application is a continuation in part of my copending application Serial No. 755,361, entitled "Process for dehydrating acetic acid and other lower fatty acids," now Patent No. 2,157,143.

Various quantities of aqueous solutions of lower aliphatic acids are obtained in the industry, and it is desirable to recover the acids therefrom in a substantially anhydrous condition. As pointed out in my copending application, several methods have been proposed for dehydrating such aliphatic solutions. It has been proposed to extract aqueous aliphatic acid solutions with low boiling point solvents such as ethyl acetate. The ethyl acetate and water would be distilled off, leaving the anhydrous acetic acid as a residue. However, such low boiling point solvents require large amounts of heat, when used in producing anhydrous acids. It has also been proposed to use high boiling point agents as, for example, agents boiling within 10–15° C. of acetic acid. In using these agents it is important that the agent be kept out of the concentrated acid when it occurs as concentrated acid. It has also been proposed to use these higher boiling point solvents in conjunction with various petroleum compounds as auxiliary agents. However, a rather complicated process results. It has also been proposed to extract acetic acid with still higher boiling point solvents, the acetic acid being treated in the vapor phase. It is apparent that heat is required to convert the acid to the vapor phase.

I have found a high boiling point solvent particularly suitable for the extraction of aqueous aliphatic acid solutions.

This solvent functions satisfactorily in cold extraction and by my novel method of use, it is possible to recover aliphatic acids from aqueous solutions with low heat expenditure. I have also devised an apparatus particularly adapted for carrying out my extraction treatment.

This invention has for one object to provide a process of concentrating aqueous aliphatic acid solutions by extraction. Another object is to provide a process particularly adapted for producing dehydrated acetic acid from aqueous solutions containing acetic acid. Still another object is to provide a method for recovering aliphatic acids from aqueous solutions containing at least one aliphatic acid, wherein the heat consumption for operating the process is relatively low and is lower than heretofore usually required. A still further object is to provide an extraction process for treating aqueous aliphatic solutions wherein a relatively high-grade acid free of solvent may be obtained.

A further object is to provide a novel extracting agent particularly adapted for the extraction of aqueous aliphatic acid solutions. Another object is to provide a solvent substantially completely immiscible with acetic acid, but not materially miscible with water. A still further object is to provide a new extracting agent chemically inert to water and aliphatic acids. Another object is to provide an extraction agent which is capable of forming an azeotropic mixture with water but not with acetic acid. A further object is to provide an extracting agent from which acetic acid may be separated. Still another object is to provide a novel extracting agent which is readily available, substantially non-toxic and non-corrosive to chemical apparatus.

A still further object is to provide an extraction apparatus particularly adapted to bring about intimate contact between the solvent and material to be extracted. Another object is to provide an extraction apparatus suitable for contacting the solvents such as di-isobutyl ketone with an aqueous aliphatic acid solution such as aqueous acetic acid. Still another object is to provide an extraction apparatus wherein various degrees of extraction may be carried out. Still another object is to provide extraction units adapted to be arranged in gravity flow extraction batteries. Other objects will appear hereinafter.

I have found that aqueous solutions containing at least one aliphatic acid, as for example aqueous acetic acid solutions, may be extracted with di-isobutyl ketone to form an extract comprising ketone, acid and water. The water may be removed as an azeotrope with the di-isobutyl ketone at temperatures below the boiling point of the acid. Thereafter the acid may be recovered in relatively pure condition as the head product, leaving the di-isobutyl ketone as a residue.

For a more complete understanding of my invention, reference will be made to the following drawings, comprising a part of the present application.

Figure 1:
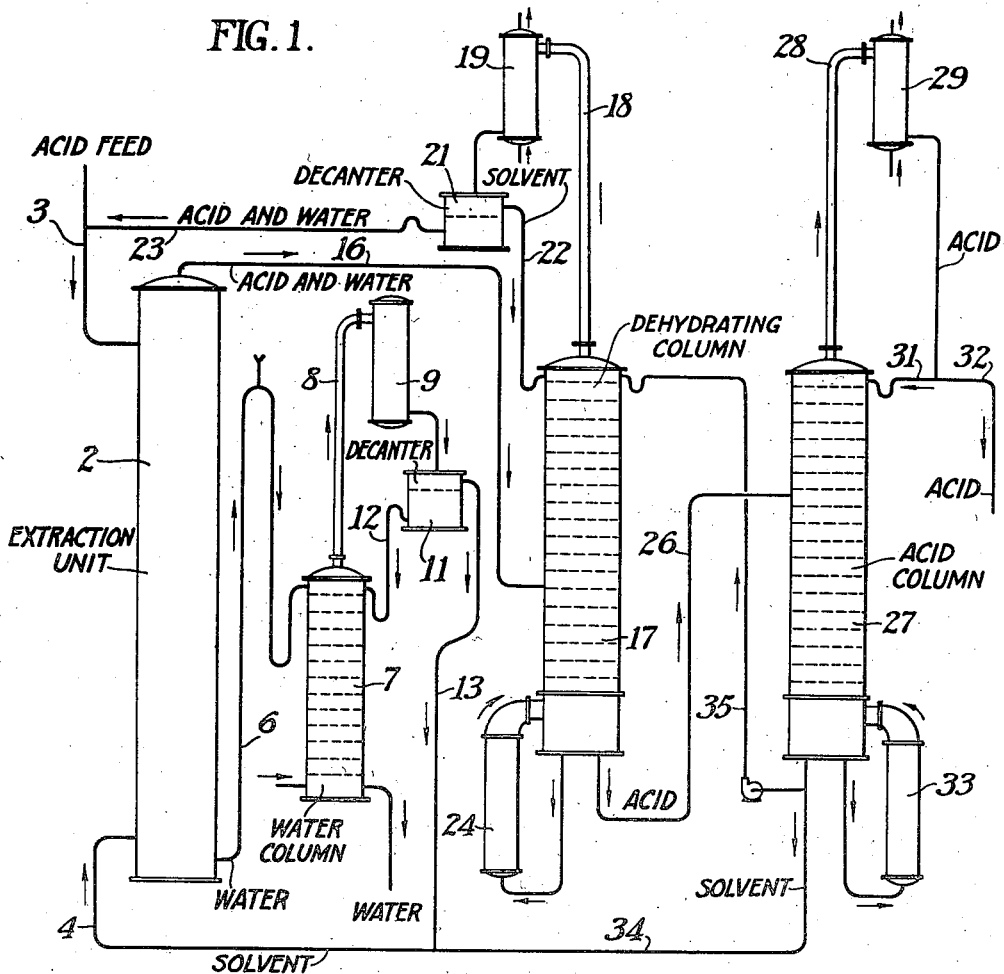
Fig. 1 is a semi-diagrammatic side elevation view in the nature of a flow sheet, showing apparatus arrangement for carrying out my process.
Figure 6:
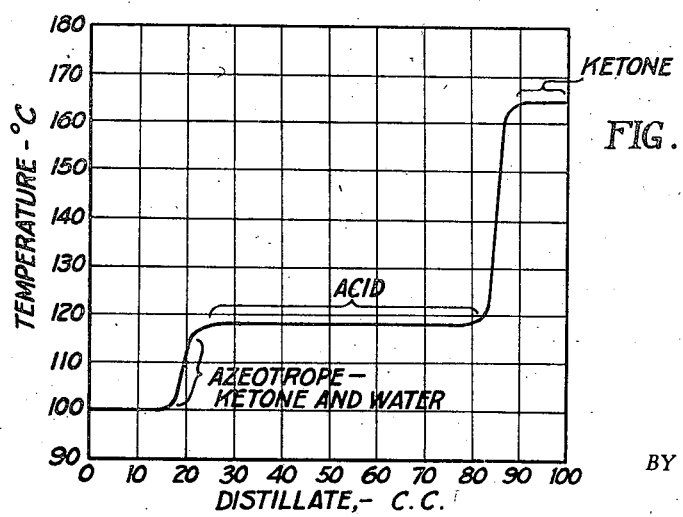
Fig. 6 is a curve graphically illustrating the clean-cut separation of the acid from solvent, obtainable in my process.

Referring to Fig. 1, 2 represents the extraction unit, the aqueous acid to be extracted to be fed in at 3 and the solvent fed at 4. The lower portion of the column is also provided with another conduit 6, leading to a distillation column 7, for recovering any solvent which might happen to be carried out in the water to waste.

This column 7 may be more or less of conventional construction and include the vapor off-take pipe 8, the condenser 9 and the decanter 11. The decanter would be connected through reflux line 12 to column 7 and by conduit 13 to the solvent line 4.

The upper portion of the extraction unit is provided with a draw-off conduit 16 leading to distillation column 17. This column would be of a construction adapted for azeotropic distillation. However, contrary to the usual dehydrating operations by azeotropic distillation, a column having comparatively few plates functions satisfactorily in my process, as will be more apparent hereinafter. Likewise, this column is provided with a vapor off-take conduit 18, one or more condensers 19, and a decanter 21. In this instance, the decanter is interconnected with the column by reflux line 22 and with the acid feed by conduit 23. Suitable heating means for the column is provided at 24. The lower portion of the column is connected through conduit 26 to another column 27, similar in construction to column 17.

This column is provided with vapor off-take conduit 28, a condenser 29, and branched conduits 31, returning reflux to the column, and 32 for withdrawing acid. Likewise, heating means are provided at 33. An extension 34 of conduit 4 connects the base of column 27 with the extraction unit 2. Also, a conduit 35 may be provided so that some solvent may be returned to the azeotropic column 17, for reflux.

Figure 2:
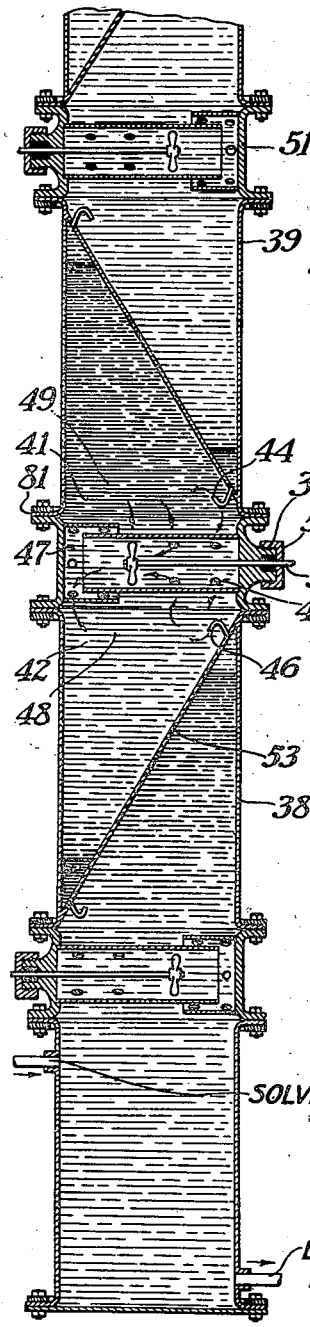
Figs. 2, 3 and 4 are semi-diagrammatic side elevation views showing in more detail the construction of apparatus units which might be employed for carrying out parts of my process.
Figure 3:
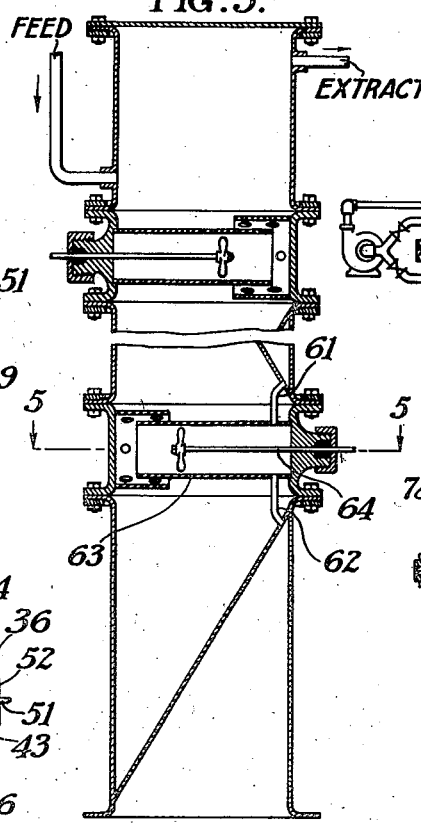
Figure 4:
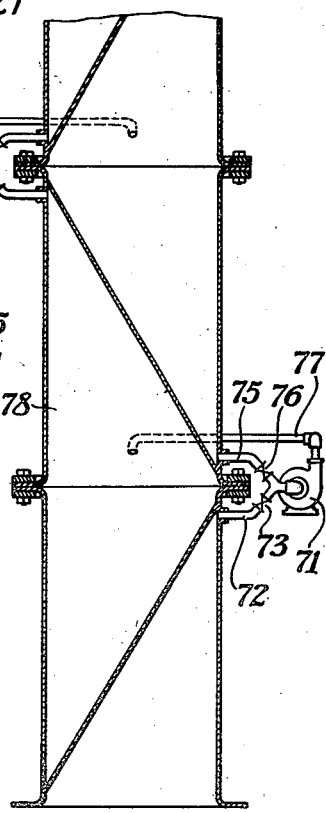

Figs. 2, 3 and 4 disclose in more detail, an extraction apparatus which may be used in my process. While column 2 may be comprised of a plurality of packed columns in which the solvent and acid are contacted countercurrently, for particularly efficient extraction units constructed more or less in accordance with Figs. 2, 3 and 4 would be employed.

Fig. 2 shows an extractor comprised of a plurality of extractor sections 36 and 37, having interposed settling sections 38 and 39.

The extractor sections include the horizontal agitator pump 41 enclosed in the baffle cylinder 42. A plurality of openings 43 are provided in the cylinder for receiving the liquids discharged through the liquid traps 44 and 46. It will be noted that these traps are right side up for bottom discharge and inverted for top discharge.

The baffle cylinder discharges into the perforated basket means 47 for minimizing turbulence. Further baffling means may be provided at 48 and 49, as for example, screens or perforated plates. A driven shaft 51, provided with suitable packing box 52 may be employed for furnishing pumping and mixing force to the extraction section. If desired, the shaft could be constructed to extend to the section.

The settling chambers 38 and 39 may be of substantially identical construction and include the diagonally extending partition plates 53 and 54. If the column is square, then these partitions will be rectangular. If the extraction unit is of cylindrical construction, the partitions would be elliptical in shape.

The space on one side of the partition comprises the settling section for the heavier liquid and on the other side thereof, is the settling section for the lighter liquid. If a greater volume of one liquid is being used or if the liquid has a relatively slower settling rate, so as to required a greater settling space, this could be accommodated by allowing a portion of the full cylinder (or column) in addition to the truncated section, to increase the settling volume either above or below the diagonal plate.

The apparatus of Fig. 3 indicates a modification of that apparatus described in detail with respect to Fig. 2. In this construction the lower and upper cells are connected directly to the agitator tube by means of the conduits 61 and 62. In this construction a non-perforated baffle cylinder 63 is employed.

Figure 5:
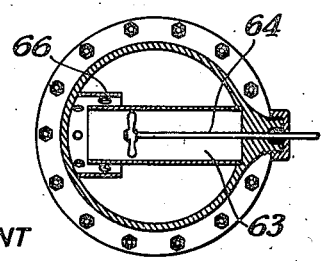
Fig. 5 is a sectional view taken on the line AA of Fig. 3.

Fig. 5 refers to the construction just described with respect to Fig. 3 and discloses a top sectional view of the baffle cylinder 63 having therein a driven agitator and shaft 64. The baffle cylinder discharges into the perforated basket 66.

In Fig. 4 still another modification of my novel extracting apparatus is shown. In this construction the pumping and agitation are externally accomplished in the mixing and pumping unit 71. This unit is connected with the various settling sections already described by means of conduits 72 and 73. Suitable valves 74 and 76 are provided in these respective pipe lines and by adjustment thereof there may be secured the proper draw-offs for balancing the agitation—pumping operations. The unit 71 is connected by conduit 77 to settling sections 78 of construction the same as already described with respect to Figs. 2 and 3.

The disclosure in Figs. 2, 3 and 4, relative to extraction apparatus is more or less diagrammatic. It is preferred to render the construction detachable and capable of dis-assembly by means of a bolted arrangement as at 81 (Fig. 2). Seven to nine, or more of these various units may be superimposed upon one another either in vertical or offset arrangement in order that the fluids may pass therethrough to some extent by gravity flow. The apparatus may be constructed of bronze, copper, stainless steel, or the like, and if desired, glass cylinders for cell walls, thereby facilitating inspection, may be included. Various other modifications may be introduced into the apparatus. For example, in Fig. 3, rather than two draw-offs as shown, a single draw-off may be arranged to take two liquids approximately from their discharge points into the unit in order to obviate too rigid control or preventing too much or too little of one or both layers being drawn from the settling sections.

Referring to Fig. 1, it is to be understood with respect to this apparatus arrangement, that various modifications may be incorporated therein. For example, to economize on equipment costs the various units may be so arranged that the dehydrating column 17 and the water column 7 utilize the same decanter. To recover some of the sensible heat imparted to the solvent in each column, heat interchangers could be inserted into the system at various locations. While these features have not been shown in the drawings, it is to be understood that they may be included in my apparatus arrangement, if desired.

For further understanding my process, as well as the functioning of my apparatus, references is made to the following example, which is set forth primarily for illustrating my preferred embodiment. In this example, an aqueous solution containing an aliphatic acid, namely, an aqueous solution from cellulose acetate manufacture, containing about 25–35% acetic acid, was fed into the extraction unit through conduit 3. Di-isobutyl ketone was fed into the extraction unit through conduit 4.

If the apparatus such as shown in Figs. 2, 3, 4 and 5 of the drawings were being employed, a solvent partially charged with acetic acid flowing through trap 44 would be drawn into the mixing cylinder through the perforations 43. Likewise, a partially extracted aqueous acid flowing from trap 46 would be drawn into the mixing cylinder. The two constituents would be intermittently contacted, in either cylinders 42, 63 or the unit 71, and then discharged to the settling sections. From one portion of the settling section solvent partially charged with acid would be drawn off to further extraction, as described. At the other portion of the settling section, extracted liquid still containing some acid, would be drawn off for further treatment with solvent. By employing a sufficiently great number of units the liquid flowing through conduit 6 (Fig. 1) comprises substantially water and may be discharged to waste. Or, if desired, it may be discharged through a stripping column such as 7, for recovering any small amounts of solvent contained therein. Assuming that a solvent is employed that is lighter than solution being extracted, solvent is fed at the bottom and the solution to the top as indicated on Figs. 2 and 3.

The extract flowing through conduit 16 comprises diisobutyl ketone, acetic acid, and some water. While water and di-isobutyl ketone are substantially immiscible, some water is taken into the extract, because the acid contained in the extract is miscible with water. This extract is fed into an intermediate section of distilling column 17.

The extract in column 17 is subjected to distillation. An azeotropic mixture of water and di-isobutyl ketone passes out of the column through conduit 18, and is condensed in condenser 19. The condensate passes to decanter 21, where it separates into an aqueous layer and a solvent layer. The solvent alone, or together with some water, returns to the column for reflux through conduit 22. The aqueous layer from the decanter, if it contains acid, may be returned to the feed 3, through the extraction unit. Since this arrangement is provided, column 17 may comprise only a few plates. Even if fractionation is incomplete, and the aqueous layer in decanter 21 contains as high as 15–20% acid, there would be no loss of acid, because this layer can be conducted to feed as described. Or, by returning further solvent through feed conduit 35 for reflux, acid passing through 18 can be lowered.

From the lower portion of column 17 is discharged a dehydrated mixture of acid and solvent. This mixture is conducted through conduit 26 to the second distilling column 27. In this column the acid is recovered in relatively pure form at the head of the column and may be withdrawn through conduit 32, a portion thereof being returned through conduit 31 for reflux. From the lower portion of column 27 the solvent from which acid has now been separated, is returned through conduits 34 and 4 for further extraction. By this procedure any small amounts of acid still remaining in the solvent would be recovered in the further extraction operations carried out in extraction unit 2. Or, as indicated, solvent may be returned through conduit 35 for supplementing the reflux through conduit 22.

As indicated above, the aforementioned example is primarily for the purposes of illustrating one way for carrying out my process as applied to treatment of aqueous acetic acid solutions. If desired, similar procedure can be applied to the treatment of aqueous solutions containing propionic or butyric acid, or aqueous solutions containing various mixtures of lower aliphatic acids. Although I have mentioned di-isobutyl ketone having a boiling point of 165–166° C., as an extracting agent, a ketone fraction boiling between 160–170° C. may be employed. That is, the di-isobutyl ketone may contain various amounts of its isomers or other similar constituents and I contemplate using such ketone fractions. Although I specifically prefer di-isobutyl ketone inasmuch as by the use of such solvents it is possible to concentrate aqueous aliphatic acid solutions with a minimum of heat expenditure, in certain broader aspects of my process, other solvents may be employed. For example, as pointed out in my copending allowed application 765,361, ketone compounds of aliphatic alcohols having from 6–10 carbon atoms, which compounds are capable of extracting lower fatty acids from aqueous solutions may be employed.

The extractor units shown in Figs. 2–5, inclusive, as indicated, are particularly effective and bring about extractive contact between aqueous fatty acid solutions and extraction agent. However, the apparatus has a wider application and may be used in various fields, as, for example, the following: The apparatus may be used in the liquid-liquid extraction by means of benzol or other solvent of the waste liquors from city gas production. That is, in the production of gas there are certain effluent liquors which may contain cresols, phenols, etc., and which, because of their unpleasant and toxic nature, may not be discharged into streams. My extraction apparatus may be used in the treatment of such materials.

My extraction apparatus may be used in the extraction of petroleum oils, distillates and the like, with various solvents. My extraction apparatus may also be used in vitamin work.

The liquid-liquid extraction for which my apparatus is adapted may be carried out in the cold and thus prevent the necessity of heating. Apparatus of Figs. 2–5, inclusive, is also useful to some extent in such procedure as the washing of the calcium carbonate sludge which results in the chemical method of manufacturing caustic soda by the interaction of sodium carbonate of lime.

It is therefore apparent from the preceding description that my invention is susceptible of some modification. Hence, I do not wish to be restricted excepting insofar as may be necessitated by the prior art and the spirit of the appended claims.

What I claim and desire to be secured by Letters Patent of the United States, is:

1. A process for producing dehydrated acid from aqueous solutions containing at least one aliphatic acid, which comprises extracting said solutions with a solvent essentially comprising a ketone compound of from 6–10 carbon atoms, to form an extract of acid, water and solvent, distilling off therefrom water and solvent as an azeotrope, condensing and decanting this distillate to obtain a solvent layer and a water layer, returning the solvent layers as reflux to the distillation, withdrawing acid and solvent as a residue of the distillation, treating this residue further for separating acid and solvent, and employing at least a part of this separated solvent for supplementing the aforementioned reflux.

2. The process for producing dehydrated acid from aqueous solutions containing an aliphatic acid, which comprises extracting said solutions with a solvent essentially comprising a 6–10 carbon atom ketone compound having a boiling point within the range of 160° C. to 170° C. which ketone compound is capable of extracting lower aliphatic acids from aqueous solutions, to form an extract of said acid, water, and said solvent, subjecting this extract to distillation for distilling off a solvent-water azeotrope, said azeotrope containing between 3% and 25% acid, condensing and decanting this distillate to obtain a solvent layer and a water layer, conducting at least a part of the water layer to the aforesaid extraction step, withdrawing acid and solvent as a residue of the distillation, distilling this residue to volatilize the acid therefrom and leave a solvent residue, and returning at least a part of the solvent residue to the aforesaid extraction.

3. A process for producing dehydrated acid from aqueous solutions containing at least one aliphatic acid, which comprises cold extracting said solutions with a solvent essentially comprising a ketone compound of from 6–10 carbon atoms, to form an extract of acid, water, and solvent, distilling off therefrom water and solvent as an azeotrope, condensing and decanting this distillate to obtain a solvent layer and a water layer, returning the solvent layer as reflux to this distillation, withdrawing acid and solvent as a residue of this distillation, distilling this residue further to volatilize acid from the solvent thereby leaving solvent as a residue, and returning at least a part of this solvent to the aforesaid extraction.

DONALD F. OTHMER.